United States Patent Office 3,036,085
Patented May 22, 1962

3,036,085
PROCESS FOR PREPARING CERTAIN INDENE COMPOUNDS
Charles Ferdinand Huebner, Chatham, N.J., assignor to Ciba Corporation, a corporation of Delaware
No Drawing. Filed July 9, 1959, Ser. No. 825,886
3 Claims. (Cl. 260—296)

The present invention relates to tertiary amino-lower alkyl-indenes. Primarily, it concerns 3-[(2-pyridyl)-lower alkyl]-2-(tertiary amino-lower alkyl)-indenes, the salts and quaternary ammonium compounds thereof.

A 2-pyridyl residue is preferably unsubstituted or may be substituted by lower alkyl, e.g. methyl or ethyl. Other substituents may be, for example, lower alkoxy, e.g. methoxy or ethoxy, or halogen, e.g. fluorine, chlorine or bromine.

The lower alkyl radical of the (2-pyridyl)-lower alkyl portion, which connects the 2-pyridyl portion with the indene nucleus, is represented, for example, by a lower alkylene radical having from one to seven, especially from one to three, carbon atoms, e.g. methylene, 1,1-ethylene, 1,2-ethylene, 1-methyl-1,2-ethylene, 2-methyl-1,2-ethylene, 1,1-propylene, 1,3-propylene or 2,2-propylene, and, in addition, 1,1-butylene, 2,2-butylene, 2,3-butylene, 1,4-butylene, 1,5-pentylene, etc.

The lower alkyl portion of the tertiary amino-lower alkyl group, attached to the 2-position of the indene nucleus, may be represented by a lower alkylene radical containing from one to seven carbon atoms; such alkylene radicals are, for example, methylene, 1,2-ethylene, 1-methyl-1,2-ethylene, 2-methyl-1,2-ethylene, 1,3-propylene, 1-methyl-1,3-propylene, 1,4-butylene, 1-methyl-1,4-butylene or 1,5-pentylene. The lower alkylene radical or a portion of it may also be part of a heterocyclic ring system, such as a saturated or partially saturated azacyclic ring system, containing the tertiary amino group as a ring member. Preferably, the lower alkyl portion of the tertiary amino-lower alkyl group separates the tertiary amino group from the 2-position of the indene nucleus by two to three carbon atoms.

Tertiary amino groups are, for example, N,N-di-lower hydrocarbon amino, N,N-lower alkylene-imino, N,N-lower oxa-alkylene-imino, N,N-lower thia-alkylene-imino or N,N-lower aza-alkylene-imino groups. Lower hydrocarbon radicals of an N,N-di-lower hydrocarbon-amino group are, for example, lower alkyl, lower alkenyl, lower cycloalkyl, monocyclic carbocyclic aryl or monocyclic carbocyclic aryl-lower alkyl radicals containing from one to seven carbon atoms, e.g. methyl, ethyl, propyl, isopropyl, butyl, isobutyl, pentyl, neopentyl, allyl, methallyl, cyclopentyl, cyclohexyl, phenyl or benzyl and the like. These hydrocarbon radicals may contain further substituents; free hydroxyl or lower alkoxy groups, e.g. methoxy or ethoxy, may be mentioned as examples of such substituents. For example, N,N-di-lower hydrocarbon-amino groups are primarily represented by N,N-di-lower alkyl-amino groups, e.g. N,N-dimethylamino, N-methyl-N-ethylamino, N,N-diethylamino, N,N-dipropylamino or N,N-diisopropylamino and the like, or, in addition by N-methyl-N-cyclopentylamino or N-methyl-N-benzylamino groups and the like. The lower alkylene radicals of an N,N-lower alkyleneimino, N,N,-lower oxa-alkylene-imino, N,N-lower thia-alkylene-imino or N,N-lower aza-alkylene-imino group contain preferably from four to six carbon atoms. Together with the nitrogen atom such alkylene, oxa-alkylene, thia-alkylene or aza-alkylene radicals represent, for example, pyrrolidino radicals, e.g. pyrrolidino or 2-methyl-pyrrolidino, piperidino radicals, e.g. piperidino, 2-methyl-piperidino, 4-methyl-piperidino, 3-hydroxy-piperidino, 3-acetoxy-piperidino or 3-hydroxymethyl-piperidino, hexamethyleneimino, morpholino, thiamorpholino or piperazino radicals, e.g. 4-methyl-piperazino, 4-hydroxyethyl-piperazino or 4-acetoxyethyl-piperazino, and the like.

The tertiary amino-lower alkyl radicals may also be represented by a heterocyclic or a heterocyclic-lower alkyl radical, in which the tertiary amino group is part of the heterocyclic nucleus, which is connected through one of its ring carbon atoms directly or by way of a lower alkylene radical, e.g. methylene or 1,2-ethylene, with the 2-position of the indene ring. Such radicals are represented, for example, by the 1-methyl-3-pyrrolidinomethyl, 1-methyl-3-piperidinomethyl and 1-methyl-4-piperidino radicals.

The 1-position of the indene nucleus is preferably unsubstituted, or, if substituted, contains preferably a hydrocarbon radical, particularly lower alkyl, e.g. methyl, or monocyclic aryl-lower alkyl, e.g. benzyl.

The six-membered carbocyclic aryl portion of the indene nucleus is preferably unsubstituted or may contain one or more substituents which may be located in any of the four positions available for substitution. Such substituents may be, for example, lower alkyl, e.g. methyl or ethyl, polyhalogeno-lower alkyl, e.g. trifluoromethyl, etherified hydroxyl, such as lower alkoxy, e.g. methoxy or ethoxy, or lower alkylenedioxy, e.g. methylenedioxy, esterified hydroxyl, such as lower alkoxy-carbonyloxy, e.g. methoxy-carbonyloxy, or ethoxy-carbonyloxy, lower alkanoyloxy, e.g. acetoxy or propionyloxy, or halogen, e.g. fluorine, chlorine or bromine, acyl, such as lower alkanoyl, e.g. acetyl or propionyl, mercapto, etherified mercapto, such as lower alkyl-mercapto, e.g. methylmercapto or ethylmercapto, nitro, amino, for example, primary amino, secondary amino, such as lower alkyl-amino, e.g. methylamino, or preferably tertiary amino, for example, N,N-di-lower alkyl-amino, e.g. dimethylamino. The six-membered carbocyclic aryl portion of the indene ring may, therefore, be represented, for example, by an unsubstituted six-membered carbocyclic aryl portion or a lower alkyl-substituted, polyhalogeno-lower alkyl-substituted, lower alkoxy-substituted, lower alkylenedioxy-substituted, lower alkoxy-carbonyloxy-substituted, lower alkanoyloxy-substituted, halogeno-substituted, lower alkanoyl-substituted, lower alkyl-mercapto-substituted, nitro-substituted, amino-substituted, lower alkyl-amino-substituted or di-lower alkyl-amino-substituted six-membered carbocyclic aryl portion.

Salts of the compounds of this invention are primarily therapeutically acceptable acid addition salts with inorganic or organic acids. Suitable inorganic acids are, for example, mineral acids, such as hydrohalic acids, e.g. hydrochloric or hydrobromic acid, or sulfuric or phosphoric acids. Organic acids are, for example, lower aliphatic hydrocarbon monocarboxylic acids, e.g. formic, acetic, propionic or pivalic acid and the like, lower aliphatic hydroxy-hydrocarbon monocarboxylic acids, e.g. glycolic or lactic acid and the like, lower aliphatic lower alkoxy-hydrocarbon monocarboxylic acids, e.g. methoxy-acetic or ethoxy-acetic acids and the like, lower aliphatic lower alkanoyl-hydrocarbon monocarboxylic acid, e.g. pyruvic acid and the like, lower aliphatic halogeno-hydrocarbon monocarboxylic acids, e.g. chloroacetic, dichloroacetic, trichloroacetic acid or bromoacetic acid and the like, lower aliphatic hydrocarbon dicarboxylic acids, e.g. oxalic, malonic, succinic, methylsuccinic, dimethylsuccinic, glutaric, α-methylglutaric, α,α-dimethylglutaric, β-methylglutaric, itaconic, homoitaconic, maleic, citraconic, homocitraconic, pyrocinchonic, xeronic or fumaric acid and the like, lower aliphatic hydroxy-hydrocarbon dicarboxylic acids, e.g. malic or tartaric acid and the like, lower aliphatic lower alkoxy-hydrocarbon dicarboxylic acids, e.g. α,β-dimethoxy-succinic or ethoxymaleic acid and the like, lower aliphatic halogenohydrocarbon dicarboxylic acids, e.g. chlorosuccinic or bromosuccinic acid and the like, lower aliphatic hydrocarbontricarboxylic acids, e.g. aconitic or tricarballylic acid and the like, lower aliphatic hydroxy-hydrocarbon tricarboxylic acids, e.g. citric acid and the like, monocylic or bicyclic carbocyclic arylcarboxylic or carbocyclic aryl-lower aliphatic carboxylic acids, e.g. benzoic, cinnamic, mandelic, salicylic, 4-amino-salicylic, 2-phenoxybenzoic or 2-acetoxybenzoic acid and the like, or monocyclic or bicyclic carbocyclic aryl-dicarboxylic acids, e.g. phthalic acid and the like. Furthermore, amino acids, e.g. methionine, trytophane, lysine, arginine, aspartic, glutamic or hydroxy-glutamic acid and the like, or organic sulfonic acids, such as lower alkane sulfonic acids, e.g. methane sulfonic or ethane sulfonic acid and the like, or lower hydroxy-alkane sulfonic acids, e.g. 2-hydroxy-ethane sulfonic acid and the like, may be suitable. Particularly useful are salts with lower aliphatic hydrocarbon dicarboxylic acids and lower aliphatic hydroxyhydrocarbon dicarboxylic acids, especially lower alkene dicarboxylic acids, e.g. maleic or citraconic acid and the like, lower hydroxyalkane dicarboxylic acids, e.g. malic or tartaric acid and the like, lower hydroxy-alkene dicarboxylic acids, e.g. hydroxymaleic or dihydroxymaleic acid and the like, or lower hydroxy-alkane tricarboxylic acid, e.g. citric acid and the like.

Salts, which may be prepared primarily for identification purposes, are particularly those with acidic organic nitro compounds, e.g. picric, picrolonic or flavianic acid, or metal complex acids, e.g. phosphotungstic, phosphomolybdic, chloroplatinic or Reinecke acid. Mono- or poly-salts may be formed depending on the number of salt-forming groups and/or the conditions used for the salt formation.

Quaternary ammonium compounds of the indene derivatives of this invention may be either mono- or poly-quaternary ammonium compounds depending on the conditions of the quaternization reaction and/or the number of tertiary amino groups present. Quaternary ammonium compounds are particularly those with lower aliphatic hydrocarbon halides or sulfonates, such as lower alkyl halides, e.g. methyl, ethyl or propyl chloride, bromide or iodide, lower alkyl lower alkane sulfonates, e.g. methyl or ethyl methane or ethane sulfonate, or lower alkyl lower hydroxy-alkane-sulfonates, e.g. methyl 2-ethane sulfonate. Also included as quaternary ammonium compounds are the corresponding quaternary ammonium hydroxides, or the salts of such hydroxides with acids, particularly with the organic acids mentioned hereinabove.

Depending on the number of asymmetric carbon atoms the indene compounds of this invention may be obtained as mixtures of racemates, racemates or antipodes, the separation of which will be discussed and illustrated hereinbelow.

The new compounds of this invention show antihistaminic effects and are intended to be used, for example, as antihistaminic agents to relieve allergic disorders, especially those caused by an excess of histamine; such allergic conditions are, for example, hay fever, urticaria, allergies caused by food, plant pollen or medicinal agents, etc. In addition, the compounds of this invention may have sedative and quieting properties, and may be utilized as sedative agents to counteract states of nervousness, anxiety, stress or shock, and/or local anesthetic effects, which render these compounds useful as local anesthetics, for example, in connection with minor surgery.

Especially valuable with respect to their antihistaminic and quieting activities are the 2-(N,N-di-lower alkyl-amino-lower alkyl)-3-[(2-pyridyl)-lower alkyl]-indenes, in which the aromatic portion of the indene nucleus is unsubstituted or may contain one or several of the previously mentioned substituents, particularly methyl, trifluoromethyl, methoxy, fluorine, chlorine or bromine, the pyridyl nucleus is unsubstituted or contains as substituents those mentioned hereinbefore as being attached to the aromatic portion of the indene nucleus, and in which lower alkyl of the (2-pyridyl)-lower alkyl portion contains from one to three carbon atoms, and the therapeutically useful acid addition salts thereof.

The invention is especially represented by the 2-(N,N-di-lower alkyl-amino-lower alkyl)-3-[(2-pyridyl)-(R₁)-methyl]-indenes, in which $R_1$ represents hydrogen or lower alkyl, particularly methyl, and the N,N-di-lower alkyl-amino group is separated from the indene nucleus by two to three carbon atoms, and in which the aromatic portion of the indene nucleus and the pyridyl nucleus is preferably unsubstituted or may contain one or several of the previously mentioned substituents, particularly methyl, trifluoromethyl, methoxy, fluorine, chlorine or bromine, and the therapeutically acceptable salts with mineral acids or lower aliphatic di- and tricarboxylic acids; these compounds exhibit powerful antihistaminic properties of long duration and are highly useful in the treatment of allergic disorders. Such compounds are, for example, 2-(N,N-di-lower alkyl-amino-lower alkyl)-3-[1-(2-pyridyl)-ethyl]-indenes, in which the N,N-dilower alkyl-amino group is separated from the indene ring by two to three carbon atoms; an outstanding member of this series of indene compounds is the 2-(2-dimethylaminoethyl)-3-[1-(2-pyridyl)-ethyl]-indene of the formula:

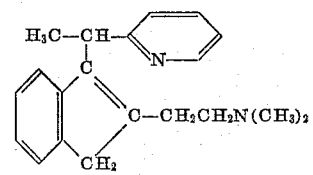

and the salts with hydrohalic acids, lower alkene dicarboxylic acids, e.g. maleic acid, and hydroxy-lower alkane dicarboxylic acids, e.g. tartaric acid.

More pronounced sedative and quieting properties are especially exhibited, for example, by 2-(di-lower alkyl-amino-lower alkyl)-3-[2-(2-pyridyl)-ethyl]-indenes, in which the N,N-di-lower alkyl-amino group is separated from the indene nucleus by two to three carbon atoms, and in which the aromatic portion of the indene nucleus is preferably unsubstituted or may contain one or several of the previously mentioned substituents, particularly methyl, trifluoromethyl, methoxy, fluorine, chlorine or bromine, and the therapeutically acceptable salts with mineral acids or lower aliphatic di- and tricarboxylic acids.

Included within the scope of this invention are, furthermore, the 3-[(4-pyridyl)-lower alkyl]-2-tertiary amino-lower alkyl)-indenes, in which 4-pyridyl and lower alkyl of the (4-pyridyl)-lower alkyl portion and tertiary amino-lower alkyl have the above-given meaning, and in which the aromatic portion of the indene nucleus is unsubstituted or substituted as previously demonstrated, and the salts and quaternary ammonium compounds thereof. These compounds exhibit antihistaminic effects and may be used as antihistaminic agents to relieve allergic disorders, particularly those caused by an excess of histamine, such as hay fever, urticaria, allergies caused by food or plant pollen, etc. A similar anihistaminic activity is shown by corresponding 3-[(3-pyridyl)-lower alkyl]-2-(tertiary amino-lower alkyl)-indenes, in which the tertiary amino-lower alkyl portion and lower alkyl of the (3-pyridyl)-lower alkyl radical have the above-given meaning, and the aromatic portion of the indene nucleus and the 3-pyridyl nucleus are unsubstituted or substituted as indicated above, salts and quaternary ammonium compounds thereof.

The new compounds of this invention may be used as medicaments in the form of pharmaceutical preparations, which contain the new indene derivatives, including racemates, antipodes, salts or quaternary ammonium compounds thereof in admixture with a pharmaceutical organic or inorganic, solid or liquid vehicle suitable for enteral, e.g. oral, or parenteral administration. To relieve allergic skin troubles, the new indene compounds may also be employed topically. For making up the preparations there may be used substances, which do not react with the new compounds, such as water, galatine, lactose, starches, lactic acid, stearic acid, magnesium stearate, stearyl alcohol, talc, vegetable oils, benzyl alcohols, gums, propylene glycol, polyalkylene glycols, or any other known carrier for medicaments. The pharmaceutical preparations may be in solid form, for example, as capsules, tablets or dragees, in liquid form, for example, as solutions, e.g. isotonic saline solutions, or as suspensions or emulsions, or in the form of salves, creams or lotions for topical administration. If desired, they may contain auxiliary substances, such as preserving agents, stabilizing agents, wetting or emulsifying agents, salts for varying the osmotic pressure or buffers, etc. They may also contain, in combination, other therapeutically useful substances.

The indene compounds of this invention may be prepared according to several procedures, the selection of which may primarily depend on the nature of the pyridyl-lower alkyl portion to the indene nucleus.

Thus, the compounds of this invention may be obtained by introducing a (2-pyridyl)-lower alkyl radical into a 2-(tertiary amino-lower alkyl)-indane compound or a salt thereof, and, if desired, converting a resulting salt into the free compound and/or, if desired, converting a free compound into a salt or a quaternary ammonium compound thereof, and/or, if desired, separating a resulting mixture of racemates into the single racemates, and/or, if desired, resolving a resulting racemate into the antipodes.

A specific modification of the general procedure comprises reacting a 2-(tertiary amino-lower alkyl)-indan-1-one with a (2-pyridyl)-lower alkyl metal compound, in which the metal may be selected from metal elements of group IA of the periodic system, i.e. the alkali metals, such as sodium, potassium, or preferably lithium. The reaction is carried out in the presence of an inert solvent, for example, a hydrocarbon, such as an aliphatic hydrocarbon, e.g. hexane, or an aromatic hydrocarbon, e.g. benzene, toluene or xylene, or in an ether, such as a di-lower alkyl ether, e.g. diethylether, a bis-monocyclic carbocyclic aryl ether, e.g. diphenyl ether, or a cyclic ether, e.g. tetrahydrofuran or p-dioxane. If desired, the reaction mixture may be cooled, or the temperature may be elevated, for example, to the boiling temperature of the solvent. If necessary, the reaction is performed in the atmosphere of an inert gas, e.g. nitrogen.

The above-mentioned (2-pyridyl)-lower alkyl metal compounds, particularly the lithium compounds, may be formed by reacting a 2-lower alkyl-pyridine with an aryl metal, particularly a phenyl lithium, compound, or with an aliphatic hydrocarbon metal compound, particularly a lower alkyl lithium compound, e.g. n-butyl lithium, in an inert solvent, such as a lower aliphatic hydrocarbon, e.g. hexane, an aromatic hydrocarbon, e.g. benzene, toluene or xylene, or an ether, such as a di-lower alkyl ether, e.g. diethylether, a di-monocyclic carbocyclic aryl ether, e.g. diphenyl ether, or a cyclic ether, e.g. tetrahydrofuran or p-dioxane, preferably in the atmosphere of an inert gas, e.g. nitrogen.

If a 2-lower alkyl-pyridine alkali metal compound, in which the lower alkyl portion contains more than one carbon atoms, is used as the reagent the (2-pyridyl)-lower alkyl portion will be attached to the carbon atom in 3-position of the indene nucleus through the carbon atom alpha to the pyridine nucleus. For example, 2-ethyl-pyridine, when reacted in the form of its lithium derivative, furnishes the 1-(2-pyridyl)-ethyl radical. The above procedure is, therefore, suitable for the preparation of the 3-[(2-pyridyl)-($R_1$)methyl]-2-(tertiary amino-lower alkyl)-indenes, in which the radical $R_1$ represents hydrogen or lower alkyl, such as methyl.

The preparation of the (2-pyridyl)-lower alkyl alkali metal, particularly lithium, reagent may be modified. A (2-pyridyl)-lower alkyl lithium reagent may also be obtained by treating with lithium an ether formed, for example, by a lower alkanol and a (2-pyridyl)-lower alkanol, in which the hydroxyl group is in α-position to the pyridine nucleus, especially, if a diluted solution of the ether in an inert solvent, particularly tetrahydrofuran, is used. The solution of the thus prepared lithium reagent is then treated with the 2-(tertiary amino-lower alkyl)-indan-1-one according to the previously-described procedure.

The above reaction of indan-1-one compounds with (2-pyridyl)-lower alkyl metal derivatives may furnish directly the desired 3-[(2-pyridyl)-lower alkyl]-2-(tertiary amino-lower alkyl)-indenes, as intermediarily formed 1-[(2-pyridyl)-lower alkyl]-2-(tertiary amino-lower alkyl)-indan-1-ols may dehydrate under the conditions of the reaction and yield the desired indene derivatives of this invention, particularly, if during the isolation of the reaction product acidic conditions are prevailing. If necessary, a dehydration of a resulting indan-1-ol compound may also be achieved, for example, by treatment of the latter with an acidic reagent, for example, with a mineral acid, primarily a hydrohalic acid, e.g. hydrochloric acid, or sulfuric acid. These acids may be used in the presence of water and/or an organic solvent, such as, for example, glacial acetic acid. Dehydration may also be accomplished by treatment with an organic acid reagent, such as an organic carboxylic acid, e.g. oxalic or p-toluene sulfonic acid, or an organic carboxylic acid anhydride, e.g. acetic acid anhydride, or with an inorganic or organic acid halide, e.g. phosphorous oxychloride or acetyl chloride, if desired, in an organic base, e.g. pyridine, and, if necessary, with heating. The indan-1-ol may also lose water at an elevated temperature without the presence of a specific dehydrating agent.

This procedure is also suitable for the preparation of the 3-[(4-pyridyl)-lower alkyl]-2-(tertiary amino-lower alkyl)-indenes, mentioned hereinbefore to have antihistaminic properties. Thus, when a 2-(tertiary amino-lower alkyl)-indan-1-one is reacted with a (4-pyridyl)-lower alkyl alkali metal, particularly lithium compound, according to the aforementioned procedure, the desired 3-[(4-pyridyl)-lower alkyl]-2-(tertiary amino-lower alkyl)-indene can be obtained directly or after dehydration of an intermediarily formed 1[(4-pyridyl)-lower alkyl]-2-(tertiary amino-lower alkyl)-indan-1-ol, which dehydration may be carried out as outlined hereinbefore.

The 2-(tertiary amino-lower alkyl)-indan-1-one compounds used as the starting materials in the above reaction are known, or, if new, may be prepared according to methods used for manufacturing known analogs. For example, an α-benzyl-malonic acid ester, such as a lower alkyl, e.g. ethyl, ester or a heterocyclic, e.g. tetrahydropyranyl, ester, in which the benzyl portion may be unsubstituted or substituted as outlined hereinabove, may be treated with a reactive ester formed by a tertiary amino-lower alkanol, in which the tertiary amino group is separated from the hydroxyl group by at least two carbon atoms, and a strong inorganic or organic acid, such as, for example, a mineral acid, e.g. hydrochloric, hydrobromic, hydriodic or sulfuric acid, to produce an α-benzyl-α-(tertiary amino-lower alkyl)-malonic acid ester, in which the tertiary amino group is separated from the α-carbon atom by at least two cabon atoms. This condensation reaction may preferably be carried out in the presence of a base, such as an alkali metal lower alkanolate, e.g. lithium, sodium or portassium methanolate, ethanolate, propanolate, isopropanolate or tertiary butanolate and the like. The resulting malonic acid ester may then be cyclized to the 2-(tertiary amino-lower alkyl)-indan-1-one, in which the tertiary amino group is separated from the indane nucleus by at least two carbon atoms. The cyclization may be carried out prior or after hydrolysis of the ester groups, for example, under alkaline conditions, such as in the presence of an aqueous alkali metal hydroxide, e.g. sodium or potassium hydroxide, and decarboxylation of a carboxyl group, for example, by heating, if desired, in the presence of a mineral acid, e.g. hydrochloric or sulfuric acid. The cyclization may be carried out, for example, by treatment with a strong Lewis acid, such as a strong mineral acid, e.g. anhydrous hydrofluoric, sulfuric or phosphoric acid, the latter, for example, in the form of polyphosphoric acid, or boron trifluoride, primarily in the form of its etherate, or aluminum chloride and the like.

The 2-(tertiary amino-methyl)-indan-1-ones may be prepared by another route, for example, by reacting indan-1-one with a secondary amine or a salt thereof in the presence of formaldehyde according to the Mannich procedure. Secondary amines are those which furnish the tertiary amino groups described hereinbefore; salts of such amines are particularly inorganic acid addition salts, for example, salts with mineral acids, e.g. hydrochloric, hydrobromic or sulfuric acid. The formaldehyde may be used in the form of a solution, e.g. aqueous formaldehyde, a polymer, for example, paraformaldehyde, or an acetal with a lower alkanol, e.g. dimethoxymethane or diethoxyethane. The reaction is advantageously carried out in the presence of a solvent, for example, a lower alkanol, e.g. methanol or ethanol, or an aqueous mixture thereof, and/or in the presence of an acid, for example, a mineral acid, e.g. hydrochloric or sulfuric acid, especially when the formaldehyde is employed in the form of a polymer or an acetal thereof. The reaction may be completed by heating, and the resulting 2-(tertiary amino-methyl)-indan-1-one may be isolated as the free base or as an acid addition salt thereof.

1-[(2-pyridyl)-lower alkyl]-2-(tertiary amino-lower alkyl)-indan-1-ols, in which the tertiary amino-lower alkyl group has the above-given meaning, and which may be formed and used as intermediates in the process for the preparation of the corresponding indanes, are new and are intended to be included within the scope of this invention. Particularly useful as intermediates are the 1-[(2-pyridyl)-(R₁)methyl]-2-(N,N-di-lower alkyl amino-lower alkyl)-indan-1-ols, in which $R_1$ represents hydrogen or lower alkyl, particularly methyl, and the N,N-di-lower alkyl-amino group is separated from the indan-1-ol nucleus by two to three carbon atoms, and in which the aromatic portion of the indan-1-ol nucleus and the pyridyl nucleus ar preferably unsubstituted or may contain one or several of the previously mentioned substituents, particularly methyl, methoxy, fluorine, chlorine or bromine. The 1-[(2-pyridyl)-lower alkyl]-2-(tertiary amino-lower alkyl)-indan-1-ols may also exist as mixtures of the diastereoisomeric racemates, single racemates or antipodes.

1-[(4-pyridyl)-lower alkyl]-2-(tertiary amino-lower alkyl)-indan-1-ols, which may be formed and used as intermediates in the preparation of the corresponding 1-[(4-pyridyl)-lower alkyl]-2-(tertiary amino-lower alkyl)-indenes by treatment of a 2-(tertiary amino-lower alkyl)-indan-1-one with a (4-pyridyl)-lower alkyl metal reagent, are new and are intended to be included within the scope of this invention. They are valuable intermediates, which may be converted to the indene derivatives as previously shown.

A modification of the general procedure for the preparation of the compounds of this invention, i.e. introduction of the (2-pyridyl)-lower alkyl radical into a 2-(tertiary amino-lower alkyl)-indane compound, comprises reacting a 2-(tertiary amino-lower alkyl)-indan-1-one with a (2-pyridyl)-lower alkyl-Grignard reagent, whereby the desired 3-[(2-pyridyl)-lower alkyl]-2-(tertiary amino-lower alkyl)-indene may be obtained directly or after dehydration of an intermediarily formed indan-1-ol compound. A (2-pyridyl)-lower alkyl Grignard reagent is, for example, a (2-pyridyl)-lower alkyl metal halide compound, in which the metal is selected from metal elements of the groups IIA and IIB of the periodic system capable of forming organo-metallic compounds. Such metals are, for example, zinc, or particularly magnesium. The halogen atom in such a Grignard reagent may be chlorine, bromine or iodine. The reaction of the indan-1-one derivative with the (2-pyridyl)-lower alkyl Grignard reagent may be carried out in the solvent used for the preparation of the organo-metallic compound, which is preferably diethyl ether, or in another inert solvent, for example, in another ether, such as a carbocyclic aryl lower alkyl ether, e.g. anisole, a di-monocyclic carbocyclic aryl ether, e.g. diphenyl ether, or a cyclic ether, e.g. tetrahydrofuran or p-dioxane, or in an organic base, e.g. N-ethylmorpholine or pyridine. Other solvents, which may also be added after the formation of the Grignard reagent and, if desired, after the removal of the solvent used for the formation of the Grignard reagent, are hydrocarbons, such as aromatic hydrocarbons, e.g. benzene, toluene or xylene, or aliphatic hydrocarbons, e.g. pentane or hexane. (2-pyridyl)-lower alkyl magnesium halides, e.g. chlorides or bromides, are the preferred reagents. The reaction may be carried out under cooling, at room temperature, and may be completed by heating, for example, to the boiling point of the solvent. An inert gas, such as nitrogen, may be used to avoid any contact with atmospheric oxygen.

An intermediarily formed indan-1-ol compound may be directly converted to the desired indene compound under the conditions of the reaction or may be treated with a dehydration agent, particularly an acidic reagent, as previously shown.

The above-described procedure, using a (2-pyridyl)-lower alkyl Grignard reactant, is especially suited for the preparation of those 3-[(2-pyridyl)-lower alkyl]-indene derivatives, in which the lower alkyl portion, connecting the 2-pyridyl radical to the indene ring, is not branched at the methylene group attached to the pyridyl radical.

This modification of the general process may also be used for the preparation of 3-[(4-pyridyl)-lower alkyl]-2-(tertiary amino-lower alkyl)-indenes, for example, by reacting a 2-(tertiary amino-lower alkyl)-indan-1-one with a (4-pyridyl)-lower alkyl-Grignard compound according to the above-given procedure. In addition, the method may be applied for the formation of 3-[(3-pyridyl)-lower alkyl]-2-(tertiary amino-lower alkyl)-indenes by substituting a (3-pyridyl)-lower alkyl-Grignard reagent for the corresponding (4-pyridyl)-lower alkyl derivative.

A second generally applicable process for the manufacture of 3-[(2-pyridyl)-lower alkyl]-2-(tertiary amino-lower alkyl)-indenes, comprises reacting a 2-(tertiary amino-lower alkyl)-indene, containing an unsubstituted methylene group as ring member of the five-membered portion of the indene nucleus, with a 2-pyridyl-lower alkanol or a 2-pyridyl-lower alkanone, dehydrating, if necessary, an intermediarily formed 1-[(2-pyridyl)-hydroxy-lower alkyl]-2-(tertiary amino-lower alkyl)-indene, and converting a resulting 1-[(2-pyridyl)-lower alkylidene]-2-(tertiary amino-lower alkyl)-indene to the desired 3-[(2-pyridyl)-lower alkyl]-2-(tertiary amino-lower alkyl)-indene by reduction, and, if desired, carrying out the optional steps.

2-pyridyl-lower alkanals are, for example, aldehydes, containing a 2-pyridyl radical, e.g. 2-pyridine carboxaldehyde, and the like, whereas 2-pyridyl-lower alkanones are ketones, containing a 2-pyridyl radical, such as, for example, lower alkyl 2-pyridyl ketones, e.g. 2-acetyl-pyridine or 2-propionyl-pyridine and the like, or lower alkyl 2-pyridyl-lower alkyl ketones, e.g. 2-pyridyl-acetone and the like.

The reaction of the carbonyl reagent, i.e. the 2-pyridyl-lower alkanal or the 2-pyridyl-lower alkanone, with the 2-(tertiary amino-lower alkyl)-indene compound may be carried out according to conditions used in Claisen condensations, for example, in the presence of a salt-forming condensation reagent, and, preferably, in a solvent. Such a reagent is particularly an alkali metal salt-forming reagent, such as an alkali metal hydroxide, e.g. lithium, sodium or potassium hydroxide, or an alkali metal lower alkanolate, e.g. lithium, sodium or potassium methanolate, ethanolate, propanolate, isopropanolate or tertiary butanolate and the like; these reagents are preferably used in a solvent, such as, for example, a lower alkanol, e.g. methanol, ethanol, propanol, isopropanol or butanol. Similar reagents are, for example, alkali metals, e.g. lithium, sodium or potassium, or alkali metal hydrides or amides, e.g. lithium, sodium or potassium hydride or amide, which reagents are used in an inert, preferably non-hydroxylic solvent, such as, for example, in an ether, e.g. p-dioxane or diethyleneglycol dimethylether, or in an aromatic hydrocarbon, e.g. benzene, toluene or xylene, if necessary while heating. Other, non-metallic condensing reagents may be, for example, quaternary ammonium hydroxides, e.g. benzyl-trimethyl-ammonium hydroxide. The reaction may be carried out under cooling, at room temperature or at an elevated temperature and, if necessary, in the atmosphere of an inert gas, e.g. nitrogen.

Whereas the reaction of the carbonyl reagent with the indene compound in the presence of an alkali metal hydroxide or an alkali metal lower alkanolate in an alcoholic solvent may yield directly the 1-[(2-pyridyl)-lower alkylidene]-2-(tertiary amino-lower alkyl)-indene, the condensation in the presence of an alkali metal, or the corresponding hydrides and amides in a non-hydroxylic solvent furnishes predominantly the 1-[(2-pyridyl)-hydroxy-lower alkyl]-2-(tertiary amino-lower alkyl)-indenes; the latter have to be dehydrated as shown hereinbelow.

Other salt-forming reagents may be Grignard reagents, such as, for example, carbocyclic aryl magnesium halides, particularly monocyclic carbocyclic aryl magnesium halides, e.g. phenyl magnesium chloride or phenyl magnesium bromide and the like, or lower hydrocarbon magnesium halides, such as lower alkyl magnesium halides, e.g. methyl, ethyl, propyl or butyl magnesium chloride, bromide or iodide and the like. These reagents yield, upon treatment with the 2-(tertiary amino-lower alkyl)-indene, an organo-metallic compound of the indene derivative, which may be reacted with one of the above-described carbonyl compounds to form 1-[(2-pyridyl)-hydroxy-lower alkyl]-2-(tertiary amino-lower alkyl)-indenes, which may be converted to the desired indene compounds as shown hereinbelow. The treatment of the 2-(tertiary amino-lower alkyl)-indene with the Grignard reagent is preferably carried out in a solvent, such as, for example, an ether, e.g. tetrahydrofuran.

If necessary, any intermediarily formed 1-[(2-pyridyl)-hydroxy-lower alkyl]-2-(tertiary amino-lower alkyl)-indene may be dehydrated according to previously given methods, for example, by treatment with an acid, such as a mineral acid, e.g. hydrochloric or sulfuric acid.

A resulting 1-[(2-pyridyl)-lower alkylidene]-2-(tertiary amino-lower alkyl)-indene compound is converted into the desired 3-[(2-pyridyl)-lower alkyl]-2-(tertiary amino-lower alkyl)-indene by reduction. A preferred procedure is represented by hydrogenation in the presence of a catalyst, such as a palladium catalyst, e.g. palladium on charcoal, whereby care has to be taken that only one mole of hydrogen is absorbed and the pyridine nucleus is not hydrogenated simultaneously. The reduction may be carried out in a solvent, preferably in a non-acidic solvent, such as, for example, a lower alkanol, e.g. methanol or ethanol. It may also be performed with nascent hydrogen, as furnished by a metal or a metal amalgam in the presence of a hydrogen donor, e.g. aluminum amalgam in the presence of wet ether, an alkali metal or an alkali metal amalgam, e.g. sodium or sodium amalgam in the presence of a lower alkanol, e.g. methanol, ethanol or butanol, and the like.

The product resulting from the reduction procedure may be the desired 3-[(2-pyridyl)-lower alkyl]-2-(tertiary amino-lower alkyl)-indene, or the latter may be obtained after rearrangement of a double bond in the reduction product. Treatment with a mineral acid, e.g. hydrochloric or sulfuric acid, or with a base, such as an alkali metal hydroxide, e.g. sodium or potassium hydroxide, or an alkali metal lower alkanolate, e.g. sodium or potassium methanolate or ethanolate, may bring about the rearrangement of a double bond. These rearrangement reagents are preferably used in the presence of solvents, such as, for example, water or lower alkanols or aqueous mixtures thereof, depending on the solubility and/or reactivity of the reagent or the reactant.

The starting materials used in this procedure are known or may be prepared according to known methods. For example, a 2-(tertiary amino-lower alkyl)-indan-1-one may be converted to the corresponding indan-1-ol by reduction, for example, by treatment with catalytically activated hydrogen, such as hydrogen in the presence of a nickel, e.g. Raney nickel, or a palladium, e.g. palladium on charcoal, catalyst, with nascent hydrogen, as furnished by a metal or a metal amalgam in the presence of a hydrogen donor, with an alkali metal borohydride, e.g. sodium borohydride, with an alkali metal aluminum hydride, e.g. lithium aluminum hydride, or with an aluminum lower alkoxide in the presence of a lower alkanol according to the Meerwein-Ponndorf-Verley method, for example, with aluminum isopropoxide in isopropanol. A resulting 2-(tertiary amino-lower alkyl)-indan-1-ol is then dehydrated, for example, in the presence of an acid, such as a mineral acid, e.g. hydrochloric or sulfuric acid, as previously shown.

The above-described modification of the general procedure may also be used for the manufacture of 3-[(4-pyridyl)-lower alkyl]-2-(tertiary amino-lower alkyl)-indenes by using in the above procedure 4-pyridyl-lower alkanal or a 4-pyridyl-lower alkanone. The corresponding 3-[(3-pyridyl)-lower alkyl]-2-(tertiary amino-lower alkyl)-indenes may be prepared by treating a 2-(tertiary amino-lower alkyl)-indene, which contains a methylene group as a ring member of the five-membered portion of the indene nucleus, with a 3-pyridyl-lower alkanal or a 3-pyridyl-lower alkanone and reducing in a resulting 2-(tertiary amino-lower alkyl)-1-[(3-pyridyl)-lower alkylidene]-indene compound the (3-pyridyl)-lower alkylidene to a (3-pyridyl)-lower alkyl group, if necessary, after dehydration of an intermediarily formed 1-[(3-pyridyl)-hydroxy-lower alkyl]-2-(tertiary amino-lower alkyl)-indene. These reactions are carried out as previously shown.

A more specific procedure, which is particularly useful for the introduction of a 2-(2-pyridyl)-ethyl substituent comprises converting a 2-(tertiary amino-lower alkyl)-indene, which contains a methylene group in the five-membered portion of the indene nucleus, into an alkali metal salt thereof and reacting the latter with a 2-vinyl-pyridine, and, if desired, carrying out the optional steps.

The alkali metal salt of the indene compound may be prepared according to known procedures. For example, the indene may be reacted with an alkali metal lower alkanolate in a lower alkanol, such as, for example, lithium, sodium or potassium methanolate, ethanolate, n-propanolate, isopropanolate, n-butanolate, isobutanolate or tertiary butanolate in the corresponding lower alkanol, e.g. methanol, ethanol, n-propanol, isopropanol, n-butanol, isobutanol or tertiary butanol; a reagent of choice is potassium tertiary butoxide in tertiary butanol. Other reagents, which may be useful for the preparation of alkali metal salts are, for example, alkali metal amides, hydrides or hydroxides, e.g. lithium, sodium or potassium amide, hydride or hydroxide, in appropriate solvents, particularly inert organic solvents with a high dielectric constant. For example, ethers, such as, p-dioxane or diethylene glycol dimethylether, or formamides, e.g. formamide or dimethylformamide, may be used with alkali metal amides or hydrides; organic tertiary bases, such as pyridine, or lower alkanols, e.g. butanol, may be employed with alkali metal hydroxides. The alkali metal salt may also be obtained by treatment of the indene compound with an alkali metal in liquid ammonia. If necessary, the alkali metal salt formation may be carried out under cooling or at an elevated temperature, and/or in a closed vessel or in the atmosphere of an inert gas, e.g. nitrogen.

Reaction of the alkali metal salt of the indene compound with a 2-vinyl pyridine may be carried out by adding the latter to the solution of the salt. The solvents of the salt formation may also be used during the addition reaction, or they may be replaced by another of the above-mentioned solvents; an excess of the 2-vinyl-pyridine compound may also serve as a solvent. The addition reaction may be carried out at an elevated temperature, and, if desired, under an increased pressure or in the atmosphere of an inert gas, e.g. nitrogen.

2-vinyl-pyridine is the reagent of choice; other reagents, such as, for example, 2-ethyl-6-vinyl-pyridine, which furnishes 3-[2-(2-ethyl-6-pyridyl)-ethyl]-2-(tertiary amino-lower alkyl)-indenes, may also be used.

Corresponding 3-[2(-4-pyridyl)-ethyl]-2-(tertiary amino-lower alkyl)-indenes may be obtained, by using in the above reaction 4-vinyl-pyridine instead of the 2-vinyl-pyridine reagents.

The compounds of this invention may be obtained as mixtures of diastereoisomeric racemates or the salts thereof, whenever these compounds contain more than one asymmetric carbon atom. Such mixtures of racemates may be separated into individual racemic compounds, the salts or the quaternary ammonium compounds thereof, using known methods, which are, for example, based on physico-chemical differences, such as solubility, for example, fractionated crystallization, if necessary, of a derivative, e.g. a salt or a quaternary ammonium compound, thereof.

The racemates of the compounds of this invention may be resolved into the optically active d- and l-forms according to procedures used for the resolution of racemic compounds. For example, the free base of a racemic d,l-compound may be dissolved in a lower alkanol, e.g. methanol or ethanol, and one of the optically active forms of an acid containing an asymmetric carbon atom, or a solution thereof, for example, in the same lower alkanol or in water or in a mixture of such solvents, is then added, whereupon a salt may be isolated, which is formed by the optically active acid with an optically active form of the base. Especially useful as optically active forms of salt-forming acids having an asymmetric carbon atom are D- and L-tartaric acid; the optically active forms of malic, mandelic, camphor sulfonic or quinic acid and the like may also be employed. The free and optically active base may be obtained from a resulting salt according to methods known for the conversion of a salt into a base, for example, as outlined hereinbelow. An optically active base may be converted into a therapeutically useful acid addition salt with one of the acids mentioned hereinbefore, or may be converted into a quaternary ammonium compound as described hereinbelow. The optically active forms may also be isolated by biochemical methods.

The indene compounds of this invention may be obtained in the form of the free bases or as the salts thereof. A salt may be converted into the free base, for example, by reaction with an alkaline reagent, such as aqueous alkali metal hydroxide, e.g. lithium, sodium or potassium hydroxide, aqueous alkali metal carbonate, e.g. sodium or potassium carbonate or hydrogen carbonate, aqueous ammonia or ammonia in a lower alkanol, e.g. methanol or ethanol. A free base may be converted into its therapeutically useful acid addition salts by reaction with one of the organic acids mentioned hereinbefore, for example, by treating a solution of the free base in a solvent, such as a lower alkanol, e.g. methanol, ethanol, propanol or isopropanol, an ether, e.g. diethylether, or a lower alkyl lower alkanoate, e.g. methyl or ethyl acetate, or a mixture of such solvents, with the acid or a solution thereof. The salts may also be obtained as the hemihydrates, monohydrates, sesquihydrates or polyhydrates depending on the conditions used in the formation of the salts. Mono- or poly-salts may be formed according to the conditions used in the procedure for the preparation of the salts and/or the number of salt-forming groups present.

The quaternary ammonium compounds of the indene derivatives of this invention may be obtained, for example, by reacting the tertiary base with an ester formed by a hydroxylated lower aliphatic hydrocarbon compound and a strong inorganic or organic acid. Hydroxylated lower aliphatic hydrocarbon compounds may contain from one to seven carbon atoms and the esters thereof are more especially those with mineral acids, e.g. hydrochloric, hydrobromic or hydriodic acid, or with strong organic acids, such as lower alkane sulfonic acids, e.g. methane or ethane sulfonic acid. Such esters are specifically lower alkyl halides, e.g. methyl, ethyl, propyl chloride bromide or iodide, or lower alkyl lower alkane sulfonates, e.g. methyl or ethyl methane or ethane sulfonate. The quaternizing reactions may be performed in the presence or absence of a solvent, under cooling, at room temperature or at an elevated temperature, at atmospheric pressure or in a closed vessel under pressure, and, if desired, in the atmosphere of an inert gas, e.g. nitrogen. Suitable solvents are more especially lower alkanols, e.g. methanol, ethanol, propanol, isopropanol, butanol or pentanol, lower alkanones, e.g. acetone or methyl ethyl ketone, or organic acid amides, e.g. formamide or dimethylformamide, and the like.

Resulting quaternary ammonium compounds may be converted into the corresponding quaternary ammonium hydroxides, for example, by reacting a quaternary ammonium halide with silver oxide or a quaternary ammonium sulfate with barium hydroxide, by treating a quaternary ammonium salt with an anion exchanger, or by electrodialysis. From a resulting quaternary ammonium hydroxide there may be obtained quaternary ammonium salts by reacting the base with acids, for example, those used for the preparation of acid addition salts. A quaternary ammonium compound may also be converted directly into another quaternary ammonium salt without the formation of an intermediate quaternary ammonium hydroxide; for example, a quaternary ammonium iodide may be reacted with freshly prepared silver chloride to yield the quaternary ammonium chloride, or a quaternary ammonium iodide may be converted into the corresponding chloride by treatment with hydrochloric acid in anhydrous methanol. Quaternary ammonium compounds may also be isolated as hydrates; depending on the conditions for their formation and/or the number of tertiary amino groups present in the molecule mono- or poly-quaternary ammonium compounds may be formed.

The invention also comprises any modification of the process wherein a compound obtainable as an intermediate at any stage of the process is used as starting material and the remaining step(s) of the process is(are) carried out. It also comprises any new intermediates, which may be formed in one of the procedures outlined hereinbefore.

In the process of this invention such starting materials are preferably used which lead to final products mentioned in the beginning as preferred embodiments of the invention.

This is a continuation-in-part application of my application No. 810,998, filed May 5, 1959, now Patent No. 2,947,756, which in turn is a continuation-in-part application of my application Serial No. 792,263, filed February 10, 1959, which in turn is a continuation-in-part application of my application Serial No. 771,225, filed November 3, 1958, now Patent No. 2,970,149, which in turn is a continuation-in-part application of my application Serial No. 754,526, filed August 12, 1958, now abandoned.

The following examples are intended to illustrate the invention and are not to be construed as being limitations thereon. Temperatures are given in degrees centigrade.

*Example 1*

To 650 ml. of a 0.37 molar solution of phenyl lithium in benzene is added dropwise 24 ml. of dry α-picoline under an atmosphere of nitrogen. After one hour, a solution of 10 g. of 2-(2-dimethylaminoethyl)-indan-1-one in 20 ml. of benzene is added while stirring, and the reaction mixture is allowed to stand at room temperature for several days. 50 ml. of water is added while cooling and stirring. The water layer is discarded and the benzene solution extracted with a solution of 20 ml. of concentrated hydrochloric acid in 100 ml. of water.

The acidic extract, containing 2-(2-dimethylaminoethyl)-1-[(2-pyridyl)-methyl]-indan-1-ol, is heated on the steam bath for one hour, the solution is then cooled, made basic with aqueous ammonia and then extracted with ether. The ether solution is dried over sodium sulfate, the solvent is removed, and the residue is distilled to yield the 2-(2-dimethylaminoethyl)-3-[(2-pyridyl)-methyl]-indene, B.P. 168–170°/0.7 mm.

The free base is converted to the dihydrochloride by treatment of an ethanol solution of the former with ethanolic hydrogen chloride and precipitation of the salt with ether. The hydroscopic 2-(2-dimethylaminoethyl)-3-[(2-pyridyl)-methyl]-indene dihydrochloride is recrystallized from a mixture of ethanol and ether, M.P. 175–177°. The corresponding maleate, prepared by treating an ethanol solution of the base with maleic acid, melts at 140° after recrystallization from ethanol.

By treating an acetone solution of the 2-(2-dimethylaminoethyl)-3-[(2-pyridyl)-methyl]-indene with methyliodide the dimethiodide of 2-(2-dimethylaminoethyl)-3-[(2-pyridyl)-methyl]-indene may be obtained.

The starting material may be prepared as follows: 33.2 g. of dihydropyran is slowly added to a stirred mixture of 50 g. of α-benzyl-malonic acid and 0.1 g. of p-toluene sulfonic acid in 130 ml. of diethylether kept at 30° during the addition of the dihydropyran. The mixture is stirred for an additional 15 minutes, then poured on ice, and the ether phase is extracted with aqueous potassium carbonate. After washing with water and drying over magnesium sulfate, the ether is evaporated under reduced pressure by keeping the temperature below 30° to yield the di-tetrahydropyranyl α-benzyl-malonate. A toluene solution of this ester is gradually added to a toluene solution of 4.86 g. of a 50% suspension of sodium hydride and mineral oil while heating and stirring for six hours. A solution of 10.8 g. of 2-dimethylaminoethyl chloride in toluene is added dropwise, and the reaction mixture is refluxed for an additional 48 hours. The toluene layer is washed with water, dried over magnesium sulfate and evaporated to yield the di-tetrahydropyranyl α-benzyl-α-(2-dimethylaminoethyl) - malonate; yield: 32.2 g. of crude material.

A mixture of the resulting ester in 180 g. of polyphosphoric acid is stirred at 110–120° during thirty minutes, and then at 150° during an additional twenty minutes. The reaction mixture is cooled, poured into ice-water, the acidic phase is neutralized with potassium carbonate and extracted with ether. The ether solution is washed with 15% aqueous hydrochloric acid, the aqueous layer is neutralized with potassium carbonate and again extracted with ether. After washing the ether layer with water and drying over magnesium sulfate, the solvent is evaporated to yield the 2-(2-dimethylaminoethyl)-indan-1-one, yield: 8 g. of crude material. The hydrochloride of the base melts at 165° after recrystallization from a mixture of ethanol and ether.

Example 2

26 g. of 2-ethyl-pyridine is added dropwise to a stirred solution of 650 ml. of an 0.37 molar solution of phenyl lithium in benzene. The addition is carried out in an atmosphere of nitrogen and while cooling to 20°. After two hours a solution of 10 g. of 2-(2-dimethylaminoethyl)-indan-1-one in 50 ml. of dry ether is added over a period of five minutes while stirring and cooling to room temperature. After standing for twenty-four hours the organo-lithium compounds are decomposed by the addition of 50 ml. of water with external cooling. After separating the water phase from the organic solution, the latter is washed several times with 50 ml. of water, and then extracted with a mixture of 40 ml. of concentrated hydrochloric acid and 100 ml. of water.

The acidic solution, containing 2-(2-dimethylaminoethyl)-1-[1-(2-pyridyl)-ethyl]-indan-1-ol, is heated on the steam bath for thirty minutes to effect dehydration to the desired indene derivative. The solution is cooled, made strongly basic with an aqueous solution of ammonia and then extracted with ether. The ether phase is dried over sodium sulfate, filtered, evaporated, and the residue is distilled. At 15 mm. pressure the excess of 2-ethyl-pyridine is removed, at 120°/0.5 mm. some unreacted 2-(2-dimethylaminoethyl)-indan-1-one distills and at 165/175°/0.5 mm. the 2-(2-dimethylaminoethyl)-3-[1-(2-pyridyl)-ethyl]-indene is collected. It may be converted to an aqueous solution of the dihydrochloride by dissolving it in the appropriate amount of dilute hydrochloric acid.

Example 3

To a solution of 1.0 g. of 2-(2-dimethylaminoethyl)-3-[1-(2-pyridyl)-ethyl]-indene in 10 ml. of ethanol is added while stirring and heating 0.4 g. of maleic acid. On cooling the 2-(2-dimethylaminoethyl)-3-[1-(2-pyridyl)-ethyl]-indene maleate crystallizes, is filtered off, washed with a small amount of ethanol and recrystallized from ethanol, M.P. 158°.

Example 4

To 1.0 g. of 2-(2-dimethylaminoethyl)-3-[1-(2-pyridyl)-ethyl]-indene in about 10 ml. of ethanol is added a solution of 0.52 g. of L-tartaric acid in 5 ml. of ethanol. After cooling during a few days in the ice box, a crystalline precipitate is formed, which is filtered off and recrystallized three times from ethanol to obtain complete resolution. The L-tartrate of one of the optically active forms of 2-(2-dimethylaminoethyl)-3-[1-(2-pyridyl)-ethyl]-indene melts at 135–137°; $[\alpha]_D^{25°}$ —106° (in ethanol). By treating an aqueous suspension of this salt with ammonia and ether an optically active form of 2-(2-dimethylaminoethyl)-3-[1-(2-pyridyl)-ethyl] - indane is obtained, which is converted to the corresponding maleate according to the procedure of Example 3, $[\alpha]_D^{25°}$ +70° (in ethanol).

Example 5

By reacting the lithium compound formed from 22 g. of γ-picoline and phenyl lithium with 10 g. of 2-(2-dimethylaminoethyl)-indan-1-one according to the procedure given in Example 2, the 2-(2-dimethylaminoethyl)-3-[(4-pyridyl)-methyl]-indene, B.P. 165–170°/0.7 mm., is obtained after dehydration of intermediarily formed 2-(2-dimethylaminoethyl)-1-[(4-pyridyl) - methyl] - indan-1-one. It can be converted into its maleate according to the procedure described in Example 3.

Example 6

To a solution of 3 g. of potassium hydroxide in 100 ml. of methanol is added 7 g. of 2-(2-dimethylaminoethyl)-indene hydrochloride and then 7 ml. of 3-pyridine carboxaldehyde, while stirring and cooling to room temperature. After standing at that temperature overnight, the greater part of the solvent is removed by distillation under reduced pressure, water is added and the crude 2 - (2 - dimethylaminoethyl) - 1 - [(3-pyridyl) - methylidene]-indene is extracted with ether.

The solvent is removed by distillation and the residue is dissolved in 50 ml. of ethanol and hydrogenated over 0.5 g. of palladium on charcoal (10%) until one mol of hydrogen is absorbed in about one hour. The reaction mixture is filtered, the solvent removed under reduced pressure and the residue dissolved in 10 ml. of benzene.

The benzene solution is chromatographed on 100 g. of aluminum oxide (basic, activity I). Cyclohexane elutes the desired 2-(2-dimethylaminoethyl) - 3 - [(3-pyridyl)-methyl]-indene, which is distilled at 160–170°/0.5 mm. It may be converted into its maleate according to the procedure of Example 3.

The starting material used in the above procedure may be prepared as follows: To a solution of 35 g. of 2-(2-dimethylaminoethyl)-indan-1-one in 100 ml. of ethanol is gradually added 10 g. of sodium borohydride while stirring. The reaction mixture is refluxed for two hours, the greater part of the ethanol is then removed by distillation and the residue is diluted with water. The 2-(2-dimethylaminoethyl)-indan-1-ol is extracted with ether and the crude base obtained after removal of the solvent; its picrate melts at 169–170°.

A solution of the crude base in 350 ml. of glacial acetic acid and 125 ml. of concentrated hydrochloric acid is refluxed for one-half hour, and most of the solvent is then distilled under reduced pressure. The residue is diluted with water, made basic with ammonia and extracted with ether. On addition of 6 N ethanolic hydrogen chloride to the ether solution, the 2-(2-dimethylaminoethyl)-indene hydrochloride precipitates and is recrystallized from ethanol, M.P. 202–205°.

Example 7

To a stirred suspension of 14 g. of lithium in 400 ml. of dry ether is added about 10 ml. of a mixture of 159 g. of bromobenzene in 200 ml. of dry ether. The reaction is carried out in the atmosphere of nitrogen. The additional bromobenzene solution is given to the reaction in such a rate as to maintain the latter.

A total of 80 g. of 2-ethyl-pyridine, dried over calcium hydride, is then added dropwise at 20° while stirring. After standing at room temperature for four hours an ether solution of 50 g. of 2-(2-dimethylaminoethyl)-indan-1-one is added while stirring and cooling to room temperature, at which temperature the reaction is allowed to stand for three days. After filtration and dilution with ether, the organic solution is washed three times with water and then extracted with 15% aqueous hydrochloric acid.

The acidic solution, containing 2-(2-dimethylaminoethyl)-1-[(2-pyridyl)-ethyl]-indan-1-ol, is heated on the steam bath for one-half hour. After cooling the solution is basified with aqueous ammonia and extracted with ether. The 2-(2-dimethylaminoethyl)-3-[1-(2-pyridyl)-ethyl]-indene is obtained after washing, drying and evaporating the solvent and distillation; yield: 23 g.

Example 8

A solution of 17 g. of 2-propyl-pyridine in 50 ml. of ether is added over a period of 15 minutes to a stirred solution of 8 g. of butyl lithium in 50 ml. of hexane in an atmosphere of dry nitrogen. After three hours a solution of 13 g. of 2-(2-dimethylaminoethyl)-indan-1-one in 50 ml. of ether is added over a period of fifteen minutes while stirring. The reaction mixture is allowed to stand for two days at room temperature; 50 ml. of water is then added dropwise, the aqueous layer is removed and the organic phase is extracted with 60 ml. of 6 N aqueous hydrochloric acid.

The acidic extract, containing 2-(2-dimethylaminoethyl)-1-[1-(2-pyridyl)-propyl]-indan-1-ol, is heated on the steam bath for one hour, cooled, basified with aqueous ammonia and extracted with ether. The ether is removed by distillation and the 2-(2-dimethylaminoethyl)-3-[1-(2-pyridyl)-propyl]-indene is distilled, B.P. 165–175°/0.5 mm.

The monomethiodide of 2-(2-dimethylaminoethyl)-3-[1-(2-pyridyl)-propyl]-indene, M.P. 255° (decomposition) after recrystallization from water, is prepared by reacting the free base in ethanol with methyl iodide.

Example 9

50 ml. of an ether solution of phenyl lithium, prepared from 1.75 g. of lithium and 20 g. of bromobenzene according to the procedure described in Example 7, is added dropwise and very slowly over a period of three hours to a stirred solution of 12 g. of 2-isopropyl-pyridine in 25 ml. of ether in an atmosphere of dry nitrogen. After standing an additional two hours, a solution of 15 g. of 2-(2-dimethylaminoethyl)-indan-1-one in 50 ml. of ether is added; the reaction mixture is allowed to stand for one day at room temperature and then worked up as described in Example 8. The dehydration product of any intermediarily formed 2-(2-dimethylaminoethyl)-1-[dimethyl-(2-pyridyl)-methyl]-indan-1-ol, is distilled to yield the desired 2 - (2 - dimethylaminoethyl)-3-[dimethyl-(2-pyridyl)-methyl]-indene, B.P. 155–160°/0.4 mm.

The methiodide of 2-(2-dimethylaminoethyl)-3-[dimethyl-(2-pyridyl)-methyl]-indene prepared according to the previously given procedure, melts at 234° (with decomposition) after recrystallization from ethanol.

Example 10

To a stirred solution of 10.7 g. of 2,6-lutidine in 25 ml. of ether in an atmosphere of dry nitrogen is added dropwise and over a period of three hours 50 ml. of an ether solution of phenyl lithium, prepared from 1.75 g. of lithium and 20 g. of bromobenzene according to the procedure described in Example 7. After standing for an additional two hours at room temperature, 15 g. of 2-(2-dimethylaminoethyl)-indan-1-one in 50 ml. of ether is added and the reaction mixture is allowed to stand at room temperature. It is worked up as described in Example 8; the 2-(2-dimethylaminoethyl)-3-[(6-methyl-2-pyridyl)-methyl]-indene, B.P. 150–155°/0.4 mm. is obtained after dehydration of any intermediarily formed 2 - (2 - dimethylaminoethyl) - 1 - [(6 - methyl - 2-pyridyl)-methyl]-indan-1-ol with hydrochloric acid.

The substitution of 2,6-lutidine by 5-chloro-2-methyl-pyridine in the above procedure yields the desired 3-[(5-chloro-2-pyridyl)-methyl] - 2 - (2-dimethylaminoethyl)-indene.

Example 11

To an ether solution of 0.125 mol of phenyl lithium (prepared from 1.75 g. of lithium and 20 g. of bromobenzene) is added while stirring in an atmosphere of nitrogen and at room temperature an ether solution of 13.3 g. of 2-ethyl-pyridine.

After standing for two hours, the reaction mixture is cooled to —5° with an ice-salt mixture, and a solution of 12.5 g. of 2-(2-diethylaminoethyl)-indan-1-one in ether is slowly added while stirring. The reaction mixture is allowed to stand at room temperature overnight and is then decomposed by carefully adding water. The organic material is extracted with ether, and the ether solution is washed with 15 percent aqueous hydrochloric acid to separate the basic material. The acidic layer, containing 2-(2-diethylaminoethyl)-1-[1-(2-pyridyl)-ethyl] - indan-1-ol, is heated on the steam bath for thirty minutes and, after cooling, is made basic with aqueous ammonia. The organic material is extracted with ether, the ether layer is washed with water and dried over sodium sulfate. The solvent is evaporated and the 2-(2-diethylaminoethyl)-3-[1-(2-pyridyl)-ethyl]-indene is distilled, B.P. 178–180/0.55 mm.; yield: 10 g.

The maleate is prepared according to the procedure of Example 3 and melts at 120° after recrystallization from ethanol.

The starting material used in the above reaction may be prepared as follows: To a warm suspension of 22 g. of sodium hydride in 1,000 ml. of toluene is added dropwise while stirring 100 g. of diethyl α-benzyl-malonate. The reaction mixture is refluxed for one hour after completion of the addition, then a solution of 70 g. of 2-diethylaminoethyl chloride in toluene is added and the reaction mixture is refluxed overnight. The toluene solution is extracted with aqueous hydrochloric acid, the acidic layer is made basic with aqueous ammonia and the organic material is extracted with ether. The ether solution is washed, dried and evaporated under reduced pressure to yield 136 g. of diethyl α-benzyl-α-(2-diethylaminoethyl)-malonate, the oxalate of which melts at 117–119°.

A mixture of 136 g. of diethyl α-benzyl-α-(2-diethylaminoethyl)-malonate, 65.5 g. of potassium hydroxide, 85 ml. of water and 340 ml. of ethanol is refluxed for 4 hours, then concentrated under reduced pressure. The solid residue is dissolved in a minimum amount of water, the aqueous solution is neutralized with acetic acid while externally cooling and the resulting α-benzyl-α-(2-diethylaminoethyl)-malonic acid is filtered off and washed with ice water and ethanol. After drying under reduced pressure, it melts at 128°; yield: 103 g.

103 g. of α-benzyl-α-(2-diethylaminoethyl)-malonic acid is heated to 180° with occasional stirring until foaming ceases; the decarboxylation is complete after approximately 15 minutes. The resulting melt is cooled and diluted with about 15 ml. of ethanol, ether is added and the 2-benzyl-4-diethylamino-butyric acid crystallizes, M.P. 102–104°; yield: 83 g.

83 g. of 2-benzyl-4-diethylamino-butyric acid is added to 415 g. of polyphosphoric acid kept at 100–120°. The temperature is then raised to 140–145° for about 20 minutes and the acid is decomposed by pouring the reaction mixture into ice water and neutralizing the aqueous solution with potassium carbonate. The 2-(2-diethylaminoethyl)-indan-1-one is extracted with ether, the ether solution is washed and dried and the ether is evaporated. The hydrochloride salt, prepared according to the previously given procedure, melts at 164–166°; yield: 12.3 g.

*Example 12*

The 5-chloro-2-(2-dimethylaminoethyl)-3-[(2-pyridyl)-methyl]-indene, purified by distillation, may be obtained by treatment of 6-chloro-2-(2-dimethylaminoethyl)-indan-1-one with the lithium compound of α-picoline according to the procedure outlined in Example 1, whereby any intermdiarily formed 6-chloro-2-(2-dimethylaminoethyl)-1-[(2-pyridyl)-methyl]-indan-1-ol is dehydrated by heating the acidic extract of the reaction product.

The starting material used in the above reaction may be prepared as follows: 70 g. of diethyl α-(4-chlorobenzyl)-malonate, B.P. 150–151°/0.5 mm., obtained by reacting 4-chlorobenzyl chloride with sodium diethyl malonate, is added to a stirred suspension of 8 g. of sodium hydride in 500 ml. of refluxing toluene. After 2 hours, 34 g. of 2-dimethylaminoethyl chloride is added dropwise and the mixture is refluxed for an additional 12 hours, then cooled and extracted with an excess of hydrochloric acid. The acidic extract is treated with aqueous ammonia and diethyl α-(4-chlorobenzyl)-α-(2-dimethylaminoethyl)-malonate is separated in a separatory funnel. It is characterized as the crystalline oxalate, which melts at 175–178° after recrystallization from a mixture of ethanol and ether.

The diethyl α-(4-chlorobenzyl)-α-(2-dimethylaminoethyl)-malonate is hydrolyzed with potassium hydroxide as described in Example 4; the resulting α-(4-chlorobenzyl)-α-(2-dimethylaminoethyl)-malonic acid melts at 180–181° after recrystallizing from water. The 2-(4-chlorobenzyl)-4-dimethylamino-butyric acid is obtained by decarboxylating the malonic acid derivative at a temperature of 185° for 5 minutes, and is obtained in crystalline form from ether. It is cyclized as described in Example 11 by treatment with polyphosphoric acid to yield the desired 6-chloro-2-(2-dimethylaminoethyl)-indan-1-one which is converted to its hydrochloride, 175–176°.

*Example 13*

By reacting the lithium compound of α-picoline with 2-[2-pyrrolidino-(N)-ethyl]-indan-1-one according to the procedure of Example 1 and hearing an aqueous hydrochloric acid solution of resulting 1-[(2-pyridyl)-methyl]-2-[2-pyrrolidino-(N)-ethyl]-indan-1-ol for one hour the 3-[(2-pyridyl)-methyl]-2-[2-pyrrolidino-(N) - ethyl]-indene is obtained and purified by distillation.

The starting material may be prepared as follows: To a cold 150 ml. toluene solution of the sodium diethyl α-benzyl-malonate, prepared from 75 g. of diethyl α-benzyl-malonate and 16 g. of a 1:1-mixture of sodium hydride and mineral oil, is added 2-pyrrolidino-(N)-ethyl chloride in toluene. This latter solution is prepared by shaking 61 g. of 2-pyrrolidino-(N)-ethyl chloride hydrochloride in 200 ml. of toluene with 50 ml. of water containing 23 g. of sodium hydroxide, drying the organic solution over potassium hydroxide pellets and using it without further purification. The reaction mixture is heated at 120° for 6 hours while stirring. The organic solvent is then evaporated under reduced pressure and the residue is refluxed for 7 hours with a solution of 40 g. of sodium hydroxide in 200 ml. of water and 300 ml. of ethanol. The mixture is acidified with concentrated aqueous hydrochloric acid and evaporated to dryness under reduced pressure. The remaining residue is heated in an oil bath with the temperature slowly rising to 180° over about one hour; the decarboxylation is complete after 30 minutes heating at this temperature. The mixture is digested with 250 ml. of hot ethanol, the warm solution is filtered and the solvent is evaporated to dryness to give the crystalline 2-benzyl-4-pyrrolidino-(N)-butyric acid hydrochloride, M.P. 178–182°.

The resulting acid hydrochloride is added in small quantities to 400 g. of polyphosphoric acid kept agitated and at a temperature of 100°. The latter is then raised to 120° and held for 30 minutes; the mixture is poured onto ice, made alkaline and extracted with ether. After the removal of the organic solvent, the 2-[2-pyrrolidino-(N)-ethyl]-indan-1-one is distilled at 148–152°/0.4 mm.

*Example 14*

The reaction of the lithium compound of 2-ethylpyridine with 2-[2-(4-methyl-1-piperazino)-ethyl]-indan-1-one according to the procedure of Example 7 furnishes 2-[2-(4-methyl - 1 - piperazino) - ethyl]-1-[1-(2-pyridyl)-ethyl]-indan-1-ol, which is dehydrated by heating with aqueous hydrochloric acid to the desired 2-[2-(4-methyl-1-piperazino)-ethyl]-3-[1-(2-pyridyl)-ethyl]-indene, purified by distillation.

The starting material may be prepared according to the procedure given in Example 13 by using the same quantities of starting material and replacing 2-pyrrolidino-(N)-ethyl chloride by 2-(4-methyl-1-piperazino)-ethyl chloride. The intermediate 2-benzyl-4-(4-methyl-1-piperazino)-butyric acid hydrochloride melts at 195–200° and is cyclized to the 2-[2-(4-methyl-1-piperazino)-ethyl]-indan-1-one, B.P. 168–170°/0.4 mm.

*Example 15*

A solution of 2-(2-dimethylaminoethyl)-6-methoxy-indan-1-one in ether is added slowly to an ether solution of the lithium compound of α-picoline under an atmosphere of nitrogen. The reaction mixture is decomposed by the addition of water, the org. material is extracted with ether and the residue of the ether extract containing 2-(2 - dimethylaminoethyl) - 6 - methoxy-1-[(2-pyridyl)-methyl]-indan-1-ol, is dehydrated by heating with aqueous hydrochloric acid to yield the 2-(2-dimethylaminoethyl)-5-methoxy-3-[(2-pyridyl)-methyl]-indene, which is purified by distillation and may be converted into the maleate according to the procedure of Example 3.

The starting material used in the above reaction may be prepared as follows: To a solution of 16.25 g. of sodium in 288 ml. of ethanol is slowly added 113.5 g. of diethyl malonate at 50°. The clear reaction solution is treated dropwise with 110.7 g. of 4-methoxy-benzyl chloride and the reaction mixture is refluxed for one hour. After filtration and evaporation of the solvent, the residue is diluted with water and the oily product is extracted with ether, the ether solution washed and dried, and the solvent evaporated. The diethyl α-(4-methoxybenzyl)-malonate is distilled, B.P. 155–165°/0.75 mm.; yield: 66.7 g.

To a refluxing suspension of 6.1 g. of sodium hydride in 550 ml. of toluene is added dropwise while stirring 66.7 g. of diethyl α-(4-methoxybenzyl)-malonate and the reaction mixture is refluxed for one hour. A solution of 31 g. of 2-dimethylamino-ethyl chloride in toluene is added, the reaction mixture heated overnight and the toluene solution then extracted with aqueous hydrochloric acid. The acidic layer is made basic with aqueous ammonia, the organic material is extracted with ether, the ether solution is washed and dried and the solvent evaporated. 77 g. of diethyl α-(4-methoxybenzyl)-α-(2-dimethylaminoethyl)-malonate is obtained and characterized as the hydrochloride salt, 145–147°.

A mixture of 73.4 g. of diethyl α-(4-methoxybenzyl)-α-(2-dimethylaminoethyl)-malonate, 26.8 g. of potassium hydroxide, 30 ml. of water and 148 ml. of ethanol is refluxed for 4 hours and then concentrated under reduced pressure. The solid residue is dissolved in a minimum amount of water and neutralized with acetic acid under external cooling. The resulting α-(4-methoxybenzyl)-α-(2-dimethylaminoethyl)-malonic acid is filtered off, washed with ice water and ethanol and dried under reduced pressure, M.P. 163–165°; yield: 45.5 g.

45.5 g. of α(4-methoxybenzyl)-α-(2-dimethylaminoethyl)-malonic acid is heated to 180° with occasional stirring until foaming ceases after completion of decarboxylation. The resulting melt is diluted with about 10 ml. of ethanol, ether is added, and the 2-(4-methoxybenzyl)-4-dimethylamino-butyric acid crystallizes, M.P. 87°; yield: 33.7 g.

33.7 g. of 2 - (4 - methoxybenzyl) - 4 - dimethylaminobutyric acid is gradually added to 168 g. of polyphosphoric acid kept at 90–120°, and the reaction mixture is heated to 140–150° for 20 minutes. It is then poured into ice water, neutralized with potassium carbonate, and, because no crystalline product is formed is made strongly basic with 3 N aqueous sodium hydroxide. The organic material is extracted with ether, the ether solution is washed with water and dried over sodium sulfate, and the solvent is then evaporated. The resulting 2-(2-dimethylaminoethyl)-6-methoxy-indan-1-one is converted to the hydrochloride, M.P. 225–227°; yield: 14.5 g.

*Example 16*

To a solution of potassium tertiary butoxide, prepared by dissolving 4 g. of potassium in 300 ml. of anhydrous tertiary butanol, is added dropwise and under an atmosphere of dry nitrogen 15 g. of 2-(2-dimethylaminoethyl)-indene. After the addition is completed, 17 g. of freshly distilled 2-vinyl-pyridine is given to the solution of the potassium salt; the reaction mixture is then refluxed overnight. The major part of the solvent is removed under reduced pressure, water is added to the concentrated solution, and the separating oil is extracted into ether. The ether solution is dried over sodium sulfate, the solvent is evaporated and the residue is distilled under reduced pressure. The excess 2-vinyl-pyridine is removed first at 15 mm. and the desired 2-(2-dimethylaminoethyl)-3-[2-(2-pyridyl)-ethyl]-indene distills at 175–180°/0.7 mm.

1 ml. of methyl iodide is added to a solution of 1 g. of 2-(2 - dimethylaminoethyl) - 3-[2 - (2-pyridyl)-ethyl]-indene in 5 ml. of ethanol at room temperature; the reaction mixture is allowed to stand for one hour and the crystalline material is then filtered off. The dimethiodide of 2-(2 - dimethylaminoethyl)-3 - [2 - (2-pyridyl)-ethyl]-indene is recrystallized from a mixture of ethanol and water, M.P. 235–237° (with decomposition).

The starting material may be prepared as described in Example 6. The resulting hydrochloride is converted to the free base by dissolving the salt in a minimum amount of water, adding aqueous ammonia and extracting the free base with ether; the ether solution is dried over sodium sulfate, the solvent is evaporated and the 2-(2-dimethylaminoethyl)-indene is distilled at 108–115°/1 mm.

The 2-(2-dimethylaminoethyl)-indene, used as the starting material in the above reaction, may be replaced by 2-(3-dimethylaminopropyl)-indene, prepared according to the procedure given in Example 6, i.e. reducing an ethanol solution of the 2-(3-dimethylaminopropyl)-indan-1-one (Example 19) with sodium borohydride, dehydrating the resulting 2-(3-dimethylaminopropyl)-indan-1-ol by heating a solution of the latter in a mixture of glacial acetic acid and concentrated hydrochloric acid and converting the resulting hydrochloride of the 2-(3-dimethylaminoethyl)-indene into the free base. The potassium salt of the latter, by treatment with potassium tertiary butoxide in tertiary butanol, may be reacted with 2-vinyl-pyridine as shown hereinabove to yield the desired 2-(3 - dimethylaminopropyl)-3 - [2-(2 - pyridyl) - ethyl]-indene.

*Example 17*

The reaction of 2-(2-dimethylaminoethyl)-3-methyl-indan-1-one with the lithium compound of 2-ethyl pyridine according to the procedure of Example 7 furnishes 2-(2 - dimethylaminoethyl) - 3-methyl - 1-[1-(2-pyridyl)-ethyl]-indan-1-ol, which is dehydrated to the desired 2-(2-dimethylaminoethyl)-1-methyl - 3-[1-(2-pyridyl) - ethyl]-indene by treatment with warm aqueous hydrochloric acid.

The starting material used in the above reaction may be prepared as follows: To a solution of 12.3 g. of sodium in 200 ml. of ethanol, kept at 50°, is slowly added 81 ml. of diethyl malonate, followed by dropwise addition of 100 g. of 1-phenylethyl bromide. The reaction mixture is refluxed for about one hour, the resulting sodium bromide is filtered off and the solvent is evaporated. The residue is distilled to give 83 g. of diethyl α-(1-phenylethyl)-malonate, B.P. 165–170/18 mm.

The diethyl α-(1-phenylethyl)-malonate is slowly added to a heated suspension of 17.5 g. of sodium hydride (1:1-mixture in mineral oil) in 750 ml. of toluene. The reaction mixture is refluxed for one hour, a toluene solution of 55 g. of 2-dimethylaminoethyl chloride is added, and refluxing is continued overnight. The basic material is extracted with 15% aqueous hydrochloric acid; the acid solution is then made basic with ammonia and extracted with ether. The ether is removed to yield 93 g. of the desired diethyl α-(2-dimethylaminoethyl)-α-(1-phenylethyl)-malonate, the oxalate of which melts at 136–138°.

This ester is hydrolyzed by refluxing with 27.7 g. of sodium hydroxide in 45.5 ml. of water and 186 ml. of ethanol for 8 hours. After evaporation of the organic solvent, a minimum amount of water is added to complete solution, whereupon the hydrochloride is formed by the addition of concentrated aqueous hydrochloric acid. The water is evaporated under reduced pressure and the residue is treated with boiling ethanol to extract the hydrochloric salt. The separated organic solution is evaporated and the residue is decarboxylated heating at 150° for 15 minutes and then raising the temperature to 180–190° until foaming ceases. The non-crystalline residue is dissolved in a minimum amount of hot ethanol and poured onto a suspension of fuller's earth in ethanol. The mixture is filtered and added to 600 g. of polyphosphoric acid at a temperature of 85° while vigorously stirring. The reaction temperature is kept at 90–95° during the addition and then raised to 95–100° for 20 minutes. After cooling, it is poured onto ice, the solution is filtered and the filtrate neutralized with potassium carbonate. The desired 2-(2-dimethylaminoethyl)-3-methyl-indan-1-one is extracted with ether and distilled after the evaporation of the organic solvent, B.P. 135°/1 mm.; yield: 31.5 g.

*Example 18*

A solution of 15 g. of dry 2-ethyl-pyridine in 25 ml. of dry benzene is added to a solution of 60 ml. of butyl lithium in hexane (equivalent to 9 g. of butyl lithium) while cooling to 25° and in an atmosphere of dry nitrogen. After three hours 12 g. of 2-(2-dimethylamino-2-methyl-ethyl)-indan-1-one in 25 ml. of benzene is added at 25°. The reaction mixture is allowed to stand for seven days at room temperature, 100 ml. of water is added dropwise to decompose the organic lithium salts and the water layer is separated. The remaining organic phase is extracted with 75 ml. of 4 N aqueous hydrochloric acid.

The acidic solution, containing 2-(2-dimethylamino-2-methyl-ethyl)-1-[1-(2-pyridyl)-ethyl]-indan-1-ol, is heated on the steam bath for thirty minutes and is then made basic with aqueous ammonia. After extraction with ether the organic layer is separated, dried over sodium sulfate and then evaporated. The remaining residue is distilled under reduced pressure and the fraction, boiling at 165–170°/0.2 mm., is collected. This fraction is a mixture of approximately equal amounts of the two racemates of 2-(2-dimethylamino-2-methyl-ethyl)-3-[1-(2-pyridyl)-ethyl]-indene.

Salts of this mixture can be prepared according to the procedure given in Example 3.

The two racemates of the above mixture of racemates may be separated as follows: 5 g. of the mixture is dissolved in 20 ml. of ethanol and 3 ml. of methyl iodide is added. Within ten minutes one of the racemates of 2-(3-dimethylamino-2-methyl-ethyl)-3-[1-(2-pyridyl)-ethyl]-indene methiodide crystallizes and is separated by filtration, M.P. 215° (decomposition). The second racemate methiodide, which is non-crystalline, can be collected by evaporating the solvent. The distillation of the separated methiodides at 170°/0.2 mm. yields the single racemates of 2-(2-dimethylamino-2-methyl-ethyl)-3-[1-(2-pyridyl)-ethyl]-indene.

The starting material used in the above reaction may be prepared as follows, 300 g. of diethyl α-benzyl-malonate is added over a period of thirty minutes to a refluxing suspension of 66 g. of sodium hydride in mineral oil (50% sodium hydride) in 2000 ml. of toluene. After refluxing for one hour a solution of 2-dimethylamino-2-methyl-ethyl chloride in toluene (prepared by dissolving 310 g. of 2-dimethylamino-2-methyl-ethyl chloride hydrochloride in 600 ml. of water, basifying the aqueous solution and extracting it with 1000 ml. of toluene, which solution is dried over sodium sulfate) is added over a period of one hour. After refluxing overnight the reaction mixture is cooled and extracted with aqueous hydrochloric acid. The acidic extract is basified with ammonia and the separating oil is extracted with ether. After drying, the ether is evaporated, leaving 396 g. of diethyl α-benzyl-α-(2-dimethylamino-2-methyl-ethyl)-malonate as residue.

120 g. of diethyl-α-benzyl-α-(2-methylamino-2-methyl-ethyl)-malonate is added to 840 g. of polyphosphoric acid at 100° while stirring. The temperature is raised slowly to 150–160° and held for thirty minutes. After treatment with ice water, the reaction mixture is made basic with potassium carbonate and extracted with ether. The ether is evaporated to yield a residue containing as the main constituent the 2-(2-dimethylamino-2-methyl-ethyl)-2-carbethoxy-indan-1-one. 75 g. of this residue is refluxed with 650 ml. of 2 N aqueous hydrochloric acid for four hours. The acidic solution is made basic with ammonia, the organic material is extracted with ether, the ether evaporated and the residue distilled at 112–114°/0.23 mm. This fraction is converted to the hydrochloride with ethanolic hydrogen chloride and the crystalline material is recrystallized from ethanol, M.P. 194–196°. This hydrochloride yields the pure 2-(2-dimethylamino-2-methyl-ethyl)-indan-1-one by treatment with ammonia.

*Example 19*

A solution of 3.4 g. of 2-ethyl-pyridine in 50 ml. ether is added while stirring, at room temperature and in an atmosphere of dry nitrogen to 14 ml. of a 2.4 molar butyl lithium solution in hexane. After standing for one hour, a solution of 2 g. of 2-(3-dimethylaminopropyl)-indan-1-one in 10 ml. of ether is added. The reaction mixture is allowed to stand overnight, is decomposed by adding water and then extracted with 30 ml. of 3 N aqueous hydrochloric acid. The acidic extract is heated for one hour on the steam bath, then made basic with aqueous ammonia and extracted with ether. The ether extract is dried over sodium sulfate and the ether, and as well as any excess of 2-ethyl-pyridine is removed by distillation at 15 mm. by gradually raising the bath temperature to 120°. The residue is dissolved in a small amount of benzene and chromatographed on 30 g. of aluminum oxide. The eluate with benzene is evaporated to dryness and the resulting 2-(3-dimethylaminopropyl)-3-[1-(2-pyridyl)-ethyl]-indene is converted to the maleate. The salt is recrystallized from ethanol, M.P. 154–155°.

The 2-(3-dimethylaminopropyl)-indane-1-one, of which the hydrochloride melts at 118–120°, and which is used as the starting material in the above reaction, may be prepared according to the procedure used for other starting materials, as, for example, outlined in Example 11. The intermediate α-benzyl-α-(3-dimethylaminopropyl)-malonic acid melts at 204–205° (after recrystallization from water) and the α-benzyl-α-(3-dimethyl-aminopropyl)-acetic acid at 110°. (after recrystallization from a mixture of ethanol and ether).

*Example 20*

3 g. of 4-chloro-2-(2-dimethylaminoethyl)-indan-1-one in 25 ml. of ether is added at room temperature to a solution of the lithium compound of 2-ethyl-pyridine, prepared by adding 28 ml. of a 2.5 molar solution of butyl lithium in hexane to 7.5 g. of 2-ethyl-pyridine in 50 ml. of ether. After standing overnight, water is added dropwise to decompose the organiometallic compounds. The organic layer is extracted with 85 ml. of 3 N aqueous hydrochloric acid and the extract is heated for one hour on the steam bath. The solution is made basic with aqueous ammonia, then extracted with ether, the ether layer is dried, and the solvent is evaporated. The residue is distilled; any excess of 2-ethyl-pyridine is removed at 15 mm. pressure and the desired 7-chloro-2-(2-dimethylaminoethyl)-3-[1-(2-pyridyl)-ethyl]-indene is collected at 200–205°/0.5 mm.

2.8 g. of the free base is treated with an ethanol solution of 1 g. of maleic acid; the solution is evaporated to dryness to yield the desired 7-chloro-2-(2-dimethylaminoethyl)-3-[1-(2-pyridyl)-ethyl]-indene maleate.

The starting material may be prepared as follows: To a solution of 36 g. of sodium in 800 ml. of absolute ethanol is added 290 ml. of diethyl malonate. A total of 257 g. of 2-chloro-benzyl chloride is given to the solution while maintaining refluxing conditions. After boiling for an additional two hours, the solution is filtered and the solvent is evaporated. The residue is diluted with an equal amount of water, the organic material is extracted with chloroform and the chloroform layer is dried over magnesium sulfate and evaporated. The residue is distilled at 195–205°/20 mm. to yield the desired diethyl α-(2-chloro-benzyl)-malonate.

To a hot suspension of 39 g. of sodium hydride (of fifty percent strength) in 1500 ml. of toluene is added dropwise while stirring 200 g. of diethyl α-(2-chloro-benzyl)-malonate. After refluxing for one hour a toluene solution of 98.5 ml. of 2-dimethylaminoethyl chloride is added. The reaction mixture is refluxed overnight; the toluene solution is extracted with 15 percent aqueous hydrochloric acid and the acid layer is made basic with aqueous ammonia. The organic material is extracted with ether, the ether solution is washed with water, dried over magnesium sulfate and evaporated. The residue represents 259 g. of crude diethyl α-(2-chloro-benzyl)-α-(2-dimethylaminoethyl)-malonate.

A mixture of 235 g. of diethyl α-(2-chloro-benzyl)-α-(2-dimethylaminoethyl)-malonate, 147 g. of potassium hydroxide, 470 ml. of ethanol and 128 ml. of water is refluxed for four hours, then concentrated under reduced pressure. The residue is dissolved in a minimum amount of water and cautiously neutralized with acetic acid. The crystalline material is filtered off, washed with ice water and ethanol to yield 160 g. of the α-(2-chloro-benzyl)-α-(2-dimethylaminoethyl)-malonic acd, M.P. 123–125° (with decarboxylation).

The α-(2-chloro-benzyl)-α-(2-dimethylaminoethyl)-malonic acid is decarboxylated by heating at 170–180° until the evolution of carbon dioxide ceases. The resulting melt is cooled and recrystallized from ether; the desired 2-(2-chloro-benzyl)-4-dimethylamino-butyric acid melts at 83°; yield: 75 g.

50 g. of the 2-(2-chloro-benzyl)-4-dimethylamino-butyric acid is added gradually and at a temperature of 95–100° to 250 g. of polyphosphoric acid; the reaction mixture is then heated at 115–120° for one hour and poured into ice water. After neutralizing with solid potassium carbonate, the organic material is extracted with ether, the ether layer is washed with water, dried over magnesium sulfate and evaporated. The residue is distilled to yield the desierd 4-chloro-2-(2-dimethylaminoethyl)-indan-1-one, B.P. 135–138°/1 mm. Its hydrochloride salt melts at 220–221°.

*Example 21*

7 g. of 2-(2-dimethylaminoethyl)-indene hydrochloride and 7 ml. of 2-acetyl-pyridine are given in succession to a solution of 3 g. of potassium hydroxide in 100 ml. of methanol while stirring. After standing, the solvent is removed under reduced pressure, water is added and the desired 2-(2-dimethylaminoethyl)-1-[1-(2-pyridyl)-1-ethylidene]-indene is extracted with ether.

The solvent is evaporated, the residue is dissolved in ethanol and the solution is treated with hydrogen in the presence of 0.5 g. of palladium on charcoal (10%) until one mol of hydrogen has been absorbed. The catalyst is filtered off, the solvent is removed from the filtrate by evaporation under reduced pressure and the residue distilled to yield the desired 2-(2-dimethylaminoethyl)-3-[1-(2-pyridyl)-ethyl]-indene, B.P. 165–175°/0.5 mm.

By replacing in the above example 2-(2-dimethylaminoethyl)-indene hydrochloride with 2-(3-dimethylaminopropyl)-indene hydrochloride (Example 16), the 2-(3-dimethylaminopropyl)-3-[1-(2-pyridyl)-ethyl]-indene can be prepared.

*Example 22*

The 3-[(2-pyridyl)-lower alkyl]-2-(tertiary amino-lower alkyl)-indene compounds may be made up into pharmaceutical preparations. Thus, the 2-(2-dimethylaminoethyl)-3-[1-(2-pyridyl)-ethyl]-indene maleate may be formulated into tablets, containing 0.002 g. of the active ingredient, as follows (for 100,000 tablets):

Ingredients: G.
2 - (2 - dimethylaminoethyl) - 3 - [1 - (2-pyridyl)-ethyl]-indene maleate _____ 200.000
Lactose (spray dried) _____ 13546.000
Magnesium stearate _____ 87.500
Talc _____ 875.000
Corn starch _____ 875.000
Polyoxyethylene stearate _____ 79.000
Carbowax 6000 (micropulverized) _____ 875.000
Confectioners sugar _____ 875.000
Colloidal silica _____ 87.500

All ingredients are screened through a No. 40 mesh stainless steel screen into a mixer and mixed for thirty minutes. The granulate is compressed into tablets weighing 0.175 g. by employing 19/32" standard concave punches and dies.

Tablets having a core, suitable for sustained and prolonged action and containing as the active ingredient 0.0001 g. of 2-(2-dimethylaminoethyl)-3-[1-(2-pyridyl)-ethyl]-indane maleate, and a coating, designed for immediate release, and containing 0.0001 g. of the same active ingredient, may be prepared as follows (for 1000 tablets):

Ingredients for core: G.
2 - (2 - dimethylaminoethyl) - 3 - [1 - (2-pyridyl)-ethyl]-indene maleate _____ 1.000
Lactose, spray dried _____ 29.000
Castorwax _____ 19.750
Stearic acid _____ 19.750
Polyethylene glycol 4000 monostearate ___ 3.000
Talc _____ 1.500
Magnesium stearate _____ 1.000

A mixture of the castorwax, stearic acid and polyethylene glycol 4000 monostearate is melted in a steam kettle. A triturate of 2-(2-dimethylaminoethyl)-3-[1-(2-pyridyl)-ethyl]-indene maleate in lactose is suspended in the melt, which is then flaked and placed into a freezer. The flakes are screened through a No. 20 screen on the oscillator, lubricated with the talc and the magnesium stearate and compressed to cores weighing 0.075 g. using 8/32" punches.

Ingredients for coating: G.
2 - (2 - dimethylaminoethyl) - 3 - [1 - (2-pyridyl)ethyl]-indene maleate _____ 1.000
Tragacanth _____ 3.300
Polyethylene glycol 6000 _____ 6.800
Lactose, spray dried _____ 157.080
Talc _____ 5.100
Magnesium stearate _____ 1.700
FDC Blue No. 1 _____ 0.020
50 percent 3A alcohol q.s.

The tragacanth, lactose, talc and magnesium stearate are thoroughly mixed after having been passed through a No. 20 screen. The carbowax is dissolved in approximately 500 ml. of the alcohol, and a solution of the color in 50 ml. of water is added. The previous mixture is treated with this liquid until proper granules are formed, which are then dried at 80° to a moisture content of 3 percent. The granulate is passed through a No. 20 screen, the 2-(2-dimethylaminoethyl)-3-[1-(2-pyridyl) - ethyl]-indene maleate is triturated with a small part of the granulate and then added. A coating of 0.175 g. is compressed around the previously-described core using 11/32" punches for a total tablet weight of 0.250 g.

Injectionable solutions, containing 1 mg./ml. of 2-(2-dimethylaminoethyl) - 3 - [1 - (2 - pyridyl) - ethyl] - indene maleate, may be prepared as follows (for 1000 ml.):

Ingredients:
2 - (2 - dimethylaminoethyl) - 3 - [1 - (2-pyridyl)-ethyl]-indene maleate _____g__ 1.000
Lactic acid _____g__ 18.000
Sodium hydroxide _____g__ 4.140
Sodium chloride _____g__ 1.520
Sodium sulfite _____g__ 1.000
Bis-sodium salt of ethylenediamine-tetracetic acid _____g__ 0.100
Water for injection, q.s _____ml__ 1000.000

The lactic acid and the sodium hydroxide are added to 40 ml. of water for injection, and the bis-sodium salt of ethylenediamine-tetracetic acid, the 2-(2-dimethylaminoethyl)-3-[2-pyridyl)-ethyl]-indene maleate, the sodium chloride and the sodium sulfite are added in this order. Nitrogen gas is passed during thirty minutes through the solution, which is then filtered through a medium porosity sintered glass filter. The solution is filled into ampuls, which are sterilized in an autoclave at 10 pounds per square inch pressure and at 115° C. for thirty minutes.

What is claimed is:

1. Process for the preparation of 2-(N,N-di-lower alkyl-amino-lower alkyl)-3-[2-(2-pyridyl)-ethyl]-indenes, which comprises reacting an alkali metal salt of a 2-(N,N-di-lower alkyl-amino-lower alkyl)-indene, containing a methylene group in the five-membered portion of the indene nucleus, with a 2-vinyl-pyridine.

2. Process according to claim 1, wherein the potassium salt of the indene compound is reacted with 2-vinyl-pyridine.

3. Process for the preparation of 2-(N,N-di-lower alkyl - amino - lower alkyl) - 3 - [2 - (4 - pyridyl)-ethyl]-indenes, which comprises reacting an alkali metal salt of a 2-(N,N-di-lower alkyl-amino-lower alkyl)-indene, containing a methylene group in the five-membered portion of the indene nucleus with a 4-vinyl-pyridine.

References Cited in the file of this patent

Magnus et al.: J. Am. Chem. Soc., pp. 3127–30, vol. 78, (1956).

Magnus et al.: J. Org. Chem., vol. 22, pp. 270–3 (1957).

Magnus: Chem. Abstracts, vol. 51, column 12901 (1957).